Jan. 15, 1963    D. F. DUNNABECK ET AL    3,074,009
PULSE POWER WELDING SYSTEM
Filed Aug. 14, 1959    2 Sheets-Sheet 1
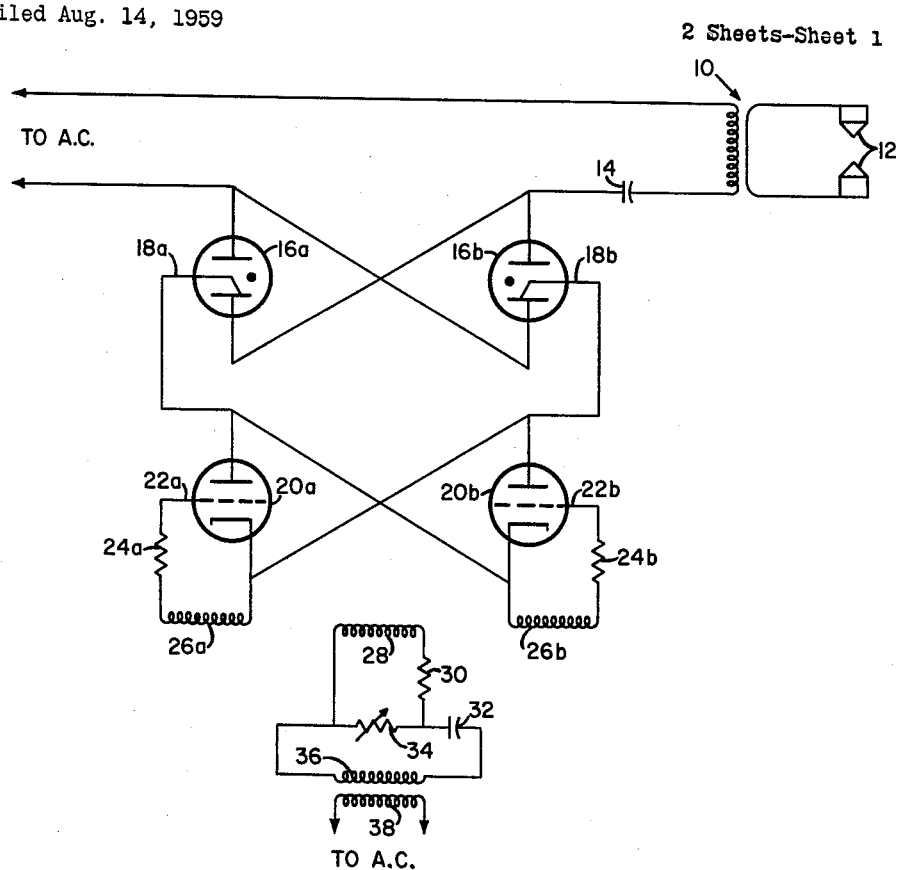
FIG-1
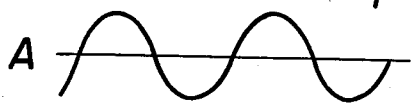
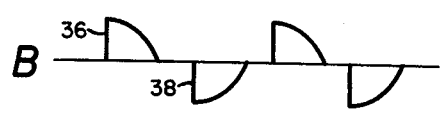
FIG-2
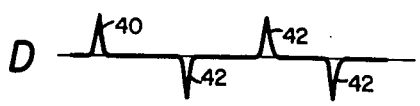
*INVENTORS*
ARTHUR W. BULL
BY DONALD F. DUNNABECK
ATTORNEY Jan. 15, 1963    D. F. DUNNABECK ET AL    3,074,009
PULSE POWER WELDING SYSTEM Filed Aug. 14, 1959    2 Sheets-Sheet 2

INVENTORS
ARTHUR W. BULL
BY DONALD F. DUNNABECK

*Allen M Kras*

ATTORNEY 3,074,009
PULSE POWER WELDING SYSTEM
Donald F. Dunnabeck, Bloomfield Hills, Mich., and Arthur W. Bull, Windsor, Ontario, Canada; said Bull assignor to Weldex Division of Metal Craft Co., Detroit, Mich., a corporation of Michigan
Filed Aug. 14, 1959, Ser. No. 833,766
4 Claims. (Cl. 323—58)

This invention relates to a resistance welding system incorporating a step down transformer which system may be connected to two or more pieces or folds of metal so as to cause them to be welded or joined together at their interfaces or abutting areas by means of the heat generated when a pulse or pulses of electric current are passed through them from the system.

In resistance welding metal parts are pressed together at the point or points where it is desired for them to be joined together by human, mechanical, pneumatic, hydraulic, gravitational, magnetic or electrostatic force either direct or multiplied or otherwise proportioned. Electrodes are connected to the parts in such a manner that when current is supplied it will pass through the planned weld area with greatest current density at the desired junction. The electrodes may or may not be used to apply the force to the desired weld areas.

For the sake of simplicity in explanation of principles and advantages of the present invention, consider now the welding of two pieces of sheet metal in a conventional spot welding machine. Two electrodes are brought together on the work pieces so as to exert force on the work and provide the electrical current connections to the work. Current of a controlled magnitude, duration and type, either direct or alternating in a single pulse or more is passed through the electrodes and work pieces. Sufficient heat is generated by the resistance to the passage of current at the junction or interface between the two work pieces to cause these surfaces to become plastic, semi-molten or molten. The pressure applied by the electrodes controls the high current area where this heating occurs and furnishes the forging pressure which causes these plastic, semi-molten or molten surfaces to fuse together.

Heat is generated throughout the current path in accordance with the resistance of the material comprising the work pieces and by the contact resistance between the electrode faces and the work pieces. This secondary heat, along with that generated at the welding surface, dissipates through the body of the metal and causes a softening of the metal so that craters or electrode indentations are hot forged into the work pieces. These indentations are usually objectionable. Also, the metallurgical properties of the metal comprising the work pieces are usually adversely affected.

Because of the loss of heat from the weld area by dissipation through the body of the metal and into the water cooled electrodes either a higher current or a longer duration of current or both is needed to achieve the necessary interface heat for a weld than would otherwise be required.

This resistance heating conforms to Joules' Law which states that heat generated is proportional to the time of current passage, to the resistance through which the current flows and to the square of the current. Therefore, if the time of current flow were cut to one sixteenth and the current were increased four fold, the resulting heat would be the same. If such currents are pulsed during a small portion of each half cycle from an alternating current supply so as to allow a cooling period between each pulse which is large compared to the pulse's time, the dissipated heat from the weld area and the secondary heating effects would have time to be innocuously absorbed to the atmosphere and by the water cooled electrodes with virtually no deleterious physical or metallurgical effects on the work pieces since there is little or no accumulation of latent heat in the work pieces. Equipment to provide pulses of such duration and frequency has recently been developed.

One form of this control employs a capacitor in series with a welding transformer and a pair of back to back ignitrons or similar rectifier tubes. The ignitrons are phase shifted so that they begin to conduct just before the voltage peak in each half cycle. Each time an ignitron begins to conduct it places a charge on the capacitor approximately equal to this peak value. This charge remains on the capacitor until the next half cycle when the other ignitron fires. At this time the charge in the capacitor, with respect to the line, is equal to approximately twice the instantaneous maximum voltage. The capacitor rapidly discharges this potential into the line as it assumes that instantaneous line voltage, generating a sharp pulse in the transformers secondary circuit. The output of this control system is therefore a series of "spiked" discharges each equal to approximately twice the instantaneous line voltage.

The series inductance and capacitance of the capacitor charging circuit may be adjusted to provide capacitor voltages in excess of twice the peak line voltage. Similarly, the ignitrons may be fired at a point in the alternating current cycle other than in synchronism with the occurrence of peak voltage in order to decrease the power supplied to the transformer secondary for welding situations when less than maximum power is required.

It has been determined that such spike outputs provide instantaneous localized heating at the welding surface which could not be achieved by a lower current of proportionately longer duration because of the dissipation of the interface surface temperature by conduction. Therefore, a lower quantity of power is required with the "spike" system than with the normal type of welder control. Accordingly, the undesirable secondary heating effects are minimized.

Such "spike" control circuits employ step down output transformers which have the ends of their secondary winding directly connected to the electrodes. The secondary winding normally comprises one or more copper tubes through which cooling water may be circulated. When a plurality of such tubes are used as a secondary they are connected in parallel.

We have established that when the normal type output transformer used with such "spike" control circuits, which is "pi" wound so as to have a plurality of primary coils connected in series, with the secondary tubes disposed between these windings, is replaced by a "layer" wound transformer wherein the primary winding comprises a single coil wound about the transformer core and the secondary comprises a plurality of copper tubes disposed over said winding, unexpectedly good results are obtained. These results include the formation of a weld with appreciably less power than would be required were a "pi" wound transformer used. As a result of the use of such lower powers the metallurgies of the metals welded are largely unaltered and the surfaces of such metals are not marked. For instance, wherein with previous type of controls it has been impossible to weld together sheets of lead foil such as are used in paste tubes because the currents necessary to achieve the weld would destroy the metal being welded, with a "spike" control having a layer wound transformer as the output it is possible to weld such materials without noticeably affecting their metallurgy or surface finish.

It is believed that the superior results which have been achieved with the use of a spike control system employing a layer wound transformer are due to that transformer's tendency toward forcing the flux normally set up around the individual turns of the high current secondary winding by that current, from the normal flux path around the individual conductor, out into the core area of the transformer. This displaced secondary current flux when forced into the core area bucks or cancels the flux set up in the core by the current flow in the primary of the transformer so as to greatly reduce the working flux density in the core area, and to greatly decrease the inductive effect and the inductive reactance of the transformer.

Because of this phenomena the maximum flux which occurs in the transformer core at full current is appreciably lower in a layer wound transformer than in the pi wound type. Since there is a lag between the time in which the voltage is removed from the primary of the transformer and time in which the flux had decayed in the core of the transformer the lower the maximum flux in the core the more quickly the secondary voltage may decay. Therefore, it is believed that the voltage induced in the secondary of a layer wound transformer may decay much more rapidly than the voltage in the secondary of a pi type transformer with the same voltage applied to the primary. As the benefits of the "spike" type control are largely attributable to the sharpness of the pulse which it produces, the use of a layer wound transformer greatly increases the efficiency of such "spike" control.

It is therefore an object of the invention to provide a resistance welder control wherein a weld may be achieved with minimum effects to the metallurgy of the welded materials or their surface finishes.

Another object is to utilize a "spike" type welder control in combination with a layer wound step down transformer to provide current for resistance welding.

Other objects, advantages and applications of the present invention will be made apparent by the following detailed description of an embodiment to the invention. The description makes reference to the accompanying drawings in which:

FIGURE 1 is a schematic representation of a "spike" type resistance welder control;

FIGURES 2A, 2B, 2C and 2D are respectively the input voltage, ignitron current, capacitor voltage, and secondary voltage, of a "spike" type resistance welder control as functions of time;

Figure 3:
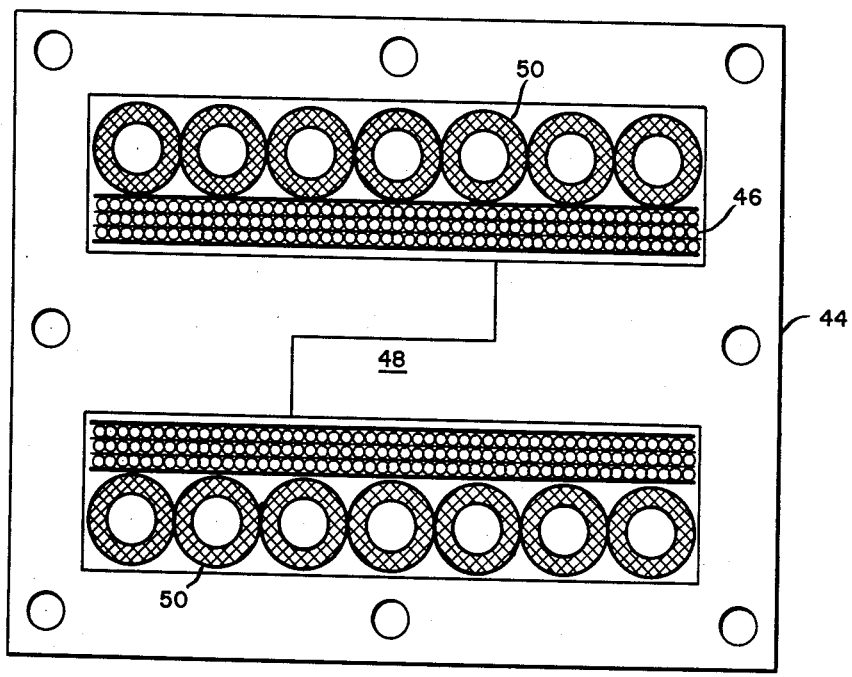
FIGURE 3 is a perspective view of a layer type welding transformer.

The basic circuitry of the "spike" type welder control includes a stepdown output transformer 10 which has as its secondary a single turn or a plurality of parallel turns. The ends of the secondary connect to a pair of welding electrodes 12 which are designed to clamp the workpieces and pass current through them. One end of the primary of the transformer 10 goes directly to an alternating current power source while the other end connects to one terminal of the capacitor 14.

The size of the capacitor is dependent upon the power output of the welder control. In practice, we have determined that when, used with a layer type transformer, which will subsequently be described, a capacitor value of approximately 100 micro-farads per kva. of rated transformer output has proved satisfactory.

The other end of the capacitor 14 connects to the alternating current power source through a pair of ignitron rectifier tubes 16A and 16B connected in a back to back relationship. That is, the plate of each tube is connected to the cathode of the opposite tube so that they act as a full wave rectifier.

The ignitor elements 18A and 18B of the two ignitrons are controlled by a circuit which employs two grid controlled thyratrons 20A and 20B.

The primary of the control transformer 28 is connected in a phase shift circuit which includes a fixed resistance 30, a capacitor 32 and a variable resistance 34. The transformer primary 28 is connected in series with the resistance 30 across the variable resistance 34. This grouping is connected in series with capacitor 32 across the secondary of a power transformer 36. The primary 38 of the transformer is connected to the alternating current power source.

By varying the resistance 34 the phase of the voltage which is impressed across the primary 28 of the control transformer is altered. This in turn varies the phase, with respect to the line voltage, of the voltage impressed across the grids 22A and 22B of the thyratrons 20A and 20B. Therefore the point in the alternating current half cycle at which the thyratrons fire may be varied. The ignitrons 18A and 18B largely act as relays and control the point of application of the heavier currents to the capacitor 14 and the transformer 10.

The ignitrons are controlled through the resistance 34 so as to fire at a point slightly before the peak of each half cycle as is shown in FIGURE 2B. The voltage applied to the capacitor 14 and the primary transformer 10 begins at a point somewhat less than 90 degrees after the start of a half cycle when one of the ignitrons fires as at point 36. It then continues until the voltage reaches zero value.

The current to the capacitor and transformer is then cut off until the other ignitron fires, as at point 38. This occurs almost at the maximum voltage point in the opposite direction.

FIGURE 2C illustrates the voltage charge on the capacitor. When one of the ignitrons fires it rapidly charges the capacitor 4 to a voltage slightly above maximum line voltage. This charge remains on the capacitor, decreasing very slowly because of leakage effects in the circuit, until the other ignitron fires. At that point the voltage of the capacitor is rapidly brought to slightly above line voltage at that point, but of opposite polarity to the previous charge. Therefore, the voltage across the capacitor rapidly changes through over twice the peak of the line voltage. It retains this charge until the first ignitron again fires, shifting the capacitor voltage through over the maximum line voltage peak to peak.

The voltage induced in the secondary of the transformer is a function of the change of voltage in the primary. Therefore, voltages are induced in the secondary only during those times when the capacitor is being charged from one voltage extreme to the other. FIGURE 2D illustrates this. The pulse 40 which occurs when the capacitor is initially being charged from zero voltage to line maximum in one direction is approximately half the magnitude of the subsequent pulses 42 which occur on the second and subsequent chargings of the transformer wherein it is charged from a maximum voltage in one direction to the maximum voltage in the opposite direction.

Figure 4:
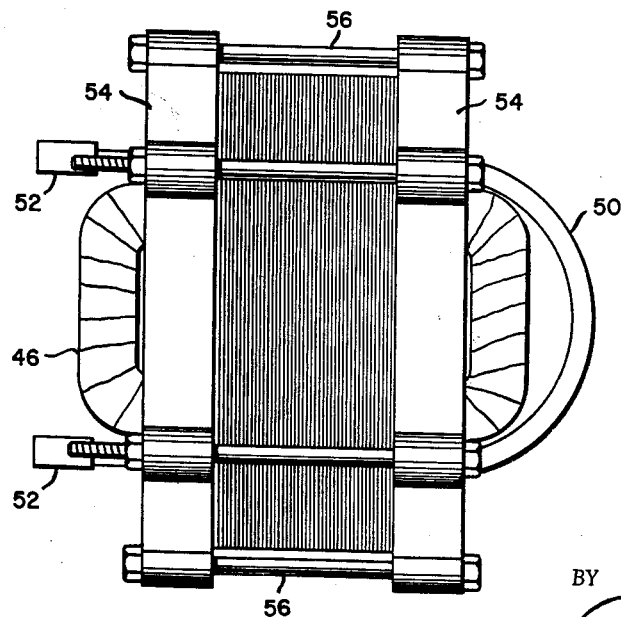
FIGURE 4 is a sectional view along lines 4—4 of FIGURE 3.

FIGURES 3 and 4 illustrate the layer wound output transformer which has been determined to have unusual and unexpected effectiveness when used in connection with the above described "spike" control system.

The core type transformer employs a non-magnetic frame. The laminations are stacked in a normal interlaced manner. The primary coil 46 comprises a plurality of turns of relatively small diameter wire wound about the central leg 48 of the transformer. The winding 46 covers the entire length of the leg 48.

The secondary of the transformer comprises a plurality of copper tubes 50 which are bent in a U shape so as to pass over the coils 46 through the two windows in the laminations. At their ends the copper tube secondary is connected to headers 52 which act as connections to cooling water which may be passed through the tubes. Flexible bus or rigid conductors (not shown) connect the headers 52 to the welding electrodes 12.

In the transformers which have been previously used with "spike" welder controls the primary is formed of a plurality of windings which occupy the entire width of the gaps in the transformer frame. These windings are connected in series and the secondary tubes are placed between the windings.

The transformer is finished with a set of end forms 54 which are fastened with bolts 56 that pass through the frame.

Having thus described our invention, we claim:

1. A system for providing resistance welding currents, comprising: a source of alternating current electric power; a capacitor; a contactor; a transformer having a metal core, a primary winding substantially surrounding the entire length of one leg of said core, said primary winding being connected in series with said capacitor and said contactor across said power source, so that such series circuit is the sole current source for said capacitor, and a secondary winding substantially surrounding the entire length of said leg of the transformer core; and a control circuit for said contactor adapted to pass current to the remainder of said circuit during a small percentage of each alternating current half cycle, said current passage period occurring in general synchronism with each alternating current half cycle so as to generate a series of sharp pulses in the primary winding of the transformer at twice line frequency.

2. A system for providing resistance welding currents, comprising: a source of alternating current electric power; a capacitor; a transformer having a metal core, a primary winding substantially surrounding the entire length of one leg of said core and a secondary winding substantially surrounding the entire length of said primary winding; and a control circuit connected in series with said capacitor and the primary winding of said transformer across said source of alternating current power, said series path being the sole current source for said capacitor, said control circuit including a pair of gaseous switching tubes connected so that each may be conductive during a portion of alternate half cycles and means for controlling the firing of said switching tubes so as to allow passage of current to the remainder of said circuitry during a short period in each alternating current half cycle which occurs in general synchronism with the occurrence of peak voltage in said half cycle.

3. A system for providing resistance welding current, comprising: a transformer having a three leg closed metal core, a primary winding substantially surrounding the entire length of the center leg of said core, and a secondary winding comprising a plurality of parallel turns of hollow copper tubing substantially surrounding the entire length of primary winding, and a control circuit connected in series with said primary winding across said alternating current power source, said circuit including a capacitor, and a contactor, such circuit being the sole source of current supply for said capacitor, said contactor being adapted to pass current through said capacitor during a small percentage of each alternating current half cycle, said current passage occurring in general synchronism with the alternation of said power source, whereby a series of pulses are provided to the primary of said transformer.

4. A system for providing resistance welding currents, comprising: a source of alternating current electric power; a capacitor; a contactor; a transformer having a three leg closed metal core, a primary winding comprising a plurality of layers of insulated wire substantially surrounding the entire length of the central leg of said core, said primary winding being connected in series with said capacitor and said contactor across said power source so that said series circuit provides the sole current source for said capacitor and a secondary winding comprising a single layer of a plurality of parallel turns of copper tubing substantially surrounding the entire length of said primary winding; and a control circuit for said contactor, adapted to pass current to the remainder of said circuit during a small percentage of each alternating current half cycle, said current passage period occurring in general synchronism with the alternation of said power source.

References Cited in the file of this patent

UNITED STATES PATENTS

| 1,255,947 | Thordarson | Feb. 12, 1918 |
| 2,256,209 | Levoy | Sept. 16, 1941 |
| 2,359,178 | White | Sept. 26, 1944 |
| 2,378,897 | Burgwin | June 26, 1945 |
| 2,508,708 | Dawson | May 23, 1950 |

FOREIGN PATENTS

| 493,554 | Canada | June 9, 1953 |